Figure 1:
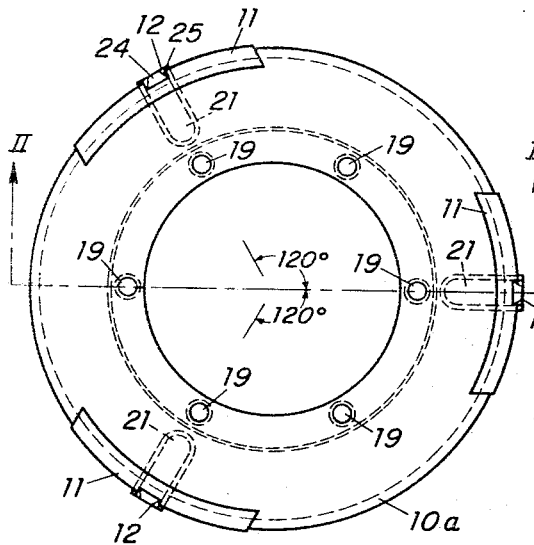

Aug. 1, 1967  G. V. LINDGREN  3,333,857

UNIVERSAL GRINDING WHEEL CHUCK

Filed Dec. 3, 1964

INVENTOR
GEORGE V. LINDGREN

BY David A. Rich

ATTORNEY

United States Patent Office 3,333,857
Patented Aug. 1, 1967

3,333,857
UNIVERSAL GRINDING WHEEL CHUCK
George V. Lindgren, Highland St.,
Townsend, Mass. 01469
Filed Dec. 3, 1964, Ser. No. 415,691
5 Claims. (Cl. 279—114)

The present invention relates to cylinder grinding wheels. More particularly, the invention relates to universal chucks for cylinder grinding wheels.

The chuck of the present invention has application to such machines as vertical surface grinders, knife grinders and other types of grinding machines employing cylindrical abrasive wheels. In my Patent No. 2,768,484 for a Grinding Wheel Chuck issued Oct. 30, 1956, a chuck is disclosed for centerless grinding wheels normally supported on a grinding machine by being gripped about the periphery. The instant invention presents an improvement over that grinding wheel chuck. In the above-noted patent, the grinding wheel disclosed and illustrated is capable of automatically centering a grinding wheel with a spindle of a grinding machine as the jaws of the chuck tighten against the grinding wheel.

That chuck, however, is subject to a number of disadvantages. The largest grinding wheel which could be received was limited in size because the jaws could not be extended beyond the circular body of the chuck. The use of liquid coolant carrying grit and grinding chips produced the build-up of a sludge providing an obstruction to free passage through the grinding wheel. In the normal vertical downward position for the grinding wheel, the operator could not see the jaws in contact with the grinding wheel.

In contrast with the above, by placing the rotatable cam ring on the top surface the grinding wheel becomes visible to the operator, the length of the cam slot is increased to enable a corresponding increase of the radial movement of the jaws beyond the periphery of the chuck body. For a given size grinding wheel, the diameter of the chuck may be substantially reduced.

It is therefore an object of the invention to provide an improved universal grinding wheel chuck which may receive a large range of sizes of grinding wheels.

A further object of the invention is to provide an improved universal grinding wheel chuck for quickly receiving, centering and locking in place a cylinder grinding wheel.

Another object of the invention is to provide an improved universal grinding wheel chuck which eliminates the obstruction to the passage of coolant, dirt and grit.

Yet another object of the invention is to provide an improved universal grinding wheel chuck characterized by more efficient operation in centering and securing grinding wheels.

In accordance with the invention there is provided a grinding wheel chuck. The chuck includes a circular body having a flat, circular receiving surface for receiving an end of a right cylindrical object. The body has a plurality of radial grooves formed therein in a plane parallel to said receiving surface. A plurality of radial movable gripping jaws each corresponds to a separate one of the grooves. The jaws are slidable along the plane of the circular flat surface and extensible beyond the circumference thereof. Continuously variable cam means are coupled to the body and the jaws for simultaneously adjusting the radial position of all of the jaws by a single continuous control motion.

Other and further objects of the invention will be apparent from the following description taken in connection with the accompanying drawings and its scope will be pointed out in the appended claims.

Figure 3:
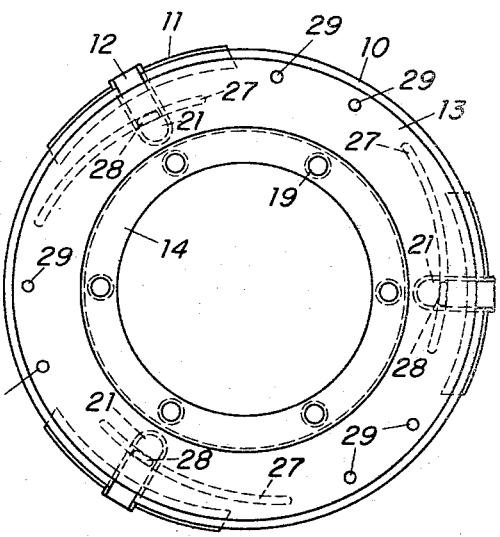
Figure 2:
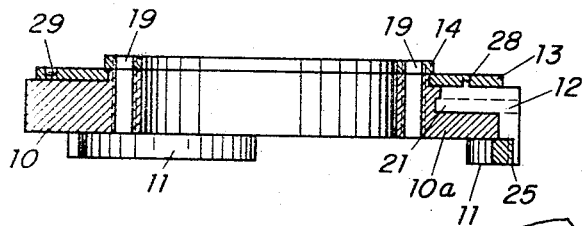
Figure 4:
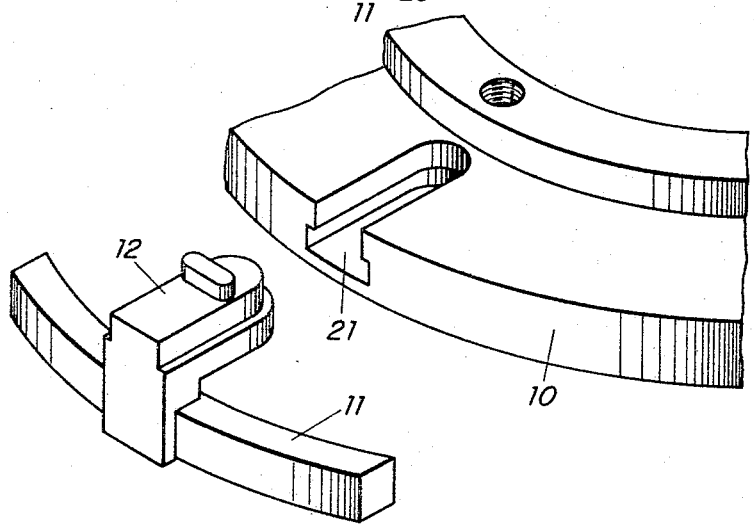

In the drawing:
FIG. 1 is a bottom view of a grinding wheel chuck embodying the invention;
FIG. 2 is a sectional view of the chuck in FIG. 1 taken along the lines II—II;
FIG. 3 is a top view of the chuck in FIG. 1; and
FIG. 4 is a detail view, exploded and in perspective, of the jaw assembly of the chuck in FIG. 1.

Referring now to the drawings and with particular reference to FIGS. 1 and 2, there is here illustrated the grinding wheel chuck of the present invention. The chuck has a circular body 10 and circular receiving surface 10a for receiving an end of a right cylindrical object. The body has a plurality of radial grooves 21 formed therein in a plane parallel to said receiving surface. A plurality of radial movable gripping jaws 11 each correspond to a separate one of the grooves. The jaws 11 as shown are slidable along the circular receiving surface 10a and extensible beyond the circumference thereof. Continuously variable cam means are coupled to the body 10 and the jaws 11 for simultaneously adjusting the radial position of all of the jaws by a single continuous control motion. Thus, a cam follower block 12 is attached to each of the jaws 11 and disposed in a groove 21. A rotatable annular cam 13 has a plurality of cam slots 27 formed therein. Each cam follower block 12 has a projection 28 disposed in the cam slot 27. The rotatable ring 13 fits around a flanged portion of the body 10 and engages the projection 28 of the cam follower blocks 12 in the cam slots 27. As shown particularly in FIG. 3, the slots 27 are spiraled in part. One extreme end of the slot 27 is at a maximum radial distance from the center of the chuck and the other end is at a minimum radial distance. It will be apparent that rotation of the annular cam 13 about the body 10 produces radial motion of the jaws 11 along the circular receiving surface 10a.

An annular retaining ring 14 is securely attached to the body 10, for example, with retainer bolts, to retain the rotatable cam in position. The body 10 is attached to a faceplate of a grinding machine by bolts or screws which extend through the faceplate and engage threaded holes 19 formed in the body. Engagement of the chuck to the faceplate is illustrated in principle in FIG. 2 of Patent No. 2,768,484. The faceplate is itself mounted on a rotatable spindle of a conventional grinding machine, preferably with a tapered engagement.

As shown particularly in FIGS. 1 and 3, the jaws 11 are preferably symmetrically oriented at 120° angles to achieve triangular symmetry. The inside surfaces of the jaws 11 are concave to correspond approximately with the periphery of a grinding wheel. The contour preferably has a smaller radius of curvature than that of the circumference of a grinding wheel to introduce a resilient grip when the jaws are radially drawn together to engage the wheel.

At the outermost end of each of the sliding blocks 12 is an enlarged dovetail stud 24. The head of the stud 24 engages an undercut groove 25 formed in each jaw 11. The jaw is thus permanently attached to the cam follower blocks 12 which move radially to adjust the radial position of the jaws in accordance with the motion of the annular cam 13. As shown in FIGS. 1 and 2, the jaws 11 are free to move radially. There are no obstructions between the jaws and the receiving surface to collect grit. During the grinding operation, abrasive grit passes to the outside of the chuck away from the jaw elements and does not collect around the jaws to bind them.

The rotatable cam 13 rotates about the spindle axis of the chuck body and is disposed against the back face of the body as shown in FIGS. 2 and 3 to pass over the cam follower blocks 12. The cam 13 is held in position on the body by the retainer ring 14 which is mounted concentrically over the rotatable cam. The retainer ring 14 is attached to the body 10 by means of the same bolts or screws used for mounting the chuck on a spindle faceplate for a grinding machine. The retainer ring 14 overlaps the annular cam 13 as shown particularly in FIG. 2. In this manner the cam 13 is held in place while it is free to rotate under the ring 14.

As shown in FIG. 3 the rotatable cam 13 has a number of holes 29 extending into the ring in the manner illustrated in FIG. 2. The holes 29 correspond with projections from a spanner wrench adapted to engage the holes in the conventional manner.

As shown in FIG. 4, the cam follower block 12 is T-shaped to mate with the T-shaped slot 21 formed in the chuck body 10. In place of the dovetail structure, the block 12 may be so shaped that the jaw 11 may be assembled with a screw or bolt to the block.

Operation

A spanner wrench engages the cam 13 by means of a pair of adjacent engagement holes 29 formed in the cam. When the cam 13 is rotated clockwise with respect to FIG. 3, the jaws 11 extend outwardly to receive a grinding wheel. When the cam 13 is rotated counter-clockwise the jaws 11 extend radially inward to engage a grinding wheel. The radial motion of the cam 13 is translated through the slots 27 to the cam follower projections 28. As the cam rotates counter-clockwise for example, the projections 28 are translated radially inward to carry the cam follower blocks 12 radially inward along the slots 21. The cam follower blocks 12 are connected through studs 24 to the jaws 11 which are also translated radially inward, sliding along the circular receiving surface 10a.

When the head of the grinding machine rotates in a clockwise direction, the drag of the grinding wheel on a workpiece in combination with the centrifugal force of the chuck body tends to urge the rotatable cam 13 in a counter-clockwise direction with respect to FIG. 3. This tends to increase the inward radial motion of the jaws to increase the gripping pressure of the jaws 11 and hold the grinding wheel securely. Because of the spring action of the jaws 11, the cam 13 is locked in place.

The holes 19 in the chuck body 10 are so located as to center the body relative to the spindle of a grinding machine when the chuck body is attached to a faceplate by means of mounting screws or bolts. The screws or bolts complete the attachment of the retainer ring 14 to the body 10. The spiraled cam slots 27 are symmetrically rotated with respect to the central axis of the chuck body. The jaws 11 and the cam follower blocks 12 as well as the grooves 21 are similarly symmetrically fashioned. Thus at any time, the gripping surfaces of the jaws 11 are equidistant from the central axis of the chuck body 10 and hence the grinding machine spindle. When the cam 13 is rotated, all of the jaws move simultaneously radially the same amount. In this manner with a single control motion a grinding wheel may be received by the circular receiving surface and secured in place concentric with the spindle of a grinding machine.

It will be apparent that the grinding wheel chuck of the present invention provides an important step forward for cylinder grinding wheels.

While there has hereinbefore been presented what is at present considered to be the preferred embodiment of the invention, it will be apparent to those of ordinary skill in the art that many changes and modifications may be made thereto without departing from the true spirit and scope of the invention. It is to be considered therefore, that all those changes and modifications which fall fairly within the scope of the invention will be a part of the invention.

What is claimed is:
1. A grinding wheel chuck, comprising:
 a circular body having a flat, circular receiving surface for receiving an end of a right cylindrical object, said body having a plurality of radial grooves formed therein in a plane parallel to said receiving surface;
 a plurality of radial movable gripping jaws each corresponding to a separate one of said grooves, said jaws being slidable along the plane of said circular flat surface and extensible beyond the circumference thereof; and
 continuously variable cam means coupled to said body and said jaws for simultaneously adjusting the radial position of all of said jaws by a single continuous control motion, said cam means including a rotatable annular cam member having a plurality of spiraled cam slots formed therein, and a plurality of cam follower blocks disposed in said grooves and connected to said jaws and engaged by said cam member in said cam slots, said cam member being disposed on said body behind and concentric with said circular receiving surface, said jaws being formed of spring hardened material and having concave gripping surface of a lesser radius of curvature than the circumference of a cylindrical grinding wheel adapted to be received by said chuck.
2. The grinding wheel chuck of claim 1, wherein:
 a set of three grooves, cam follower blocks, jaws, and cam slots are provided whereby the motion of said jaws is along three radii oriented at 120° angles.
3. The grinding wheel chuck of claim 1, wherein:
 a retainer ring is connected to said body concentric with said cam member in fixed position overlapping said cam member.
4. The grinding wheel chuck of claim 1, wherein:
 said annular cam member has spaced engagement holes formed therein for engagement with a spanner wrench.
5. The grinding wheel chuck of claim 1, wherein:
 the motions of the jaws are along a plurality of radii oriented at equal angles.

References Cited

UNITED STATES PATENTS

| | | | |
|---|---|---|---|
| 83,349 | 10/1868 | Whiton | 279—116 |
| 981,724 | 1/1911 | Vold | 279—114 X |
| 1,503,635 | 8/1924 | Butler | 279—114 X |
| 2,514,641 | 7/1950 | Harris | 279—114 X |

ROBERT C. RIORDON, *Primary Examiner.*

H. V. STAHLHUTH, E. A. CARPENTER,
*Assistant Examiners.*